United States Patent [19]

Ravenhall

[11] 4,045,149
[45] Aug. 30, 1977

[54] PLATFORM FOR A SWING ROOT TURBOMACHINERY BLADE

[75] Inventor: Richard Ravenhall, Cincinnati, Ohio

[73] Assignee: The United States of America as represented by the Administrator of the National Aeronautics and Space Administration, Washington, D.C.

[21] Appl. No.: 654,787

[22] Filed: Feb. 3, 1976

[51] Int. Cl.² .......................................... F01D 5/30
[52] U.S. Cl. ............................ 416/135; 416/190; 416/193 A; 416/241 A
[58] Field of Search .................. 416/190, 193 A, 131, 416/134, 135, 239, 248, 219–221, 230, 241 A

[56] References Cited

U.S. PATENT DOCUMENTS

| | | | |
|---|---|---|---|
| 2,877,980 | 3/1959 | Stalker | 416/190 |
| 2,936,155 | 5/1960 | Howell et al. | 416/134 |
| 2,967,043 | 1/1961 | Dennis | 416/221 |
| 3,487,879 | 1/1970 | McCarthy et al. | 416/220 |
| 3,656,864 | 4/1972 | Wagle | 416/193 A X |
| 3,801,222 | 4/1974 | Violette | 416/220 |
| 3,860,361 | 1/1975 | McMurtry et al. | 416/131 X |
| 3,905,722 | 9/1975 | Guy et al. | 416/193 A |

FOREIGN PATENT DOCUMENTS 1,341,910  9/1963  France ............................ 416/193 A Primary Examiner—Everette A. Powell, Jr.
Attorney, Agent, or Firm—Norman T. Musial; Derek P. Lawrence; Robert C. Lampe, Jr.

[57] ABSTRACT

A rotor apparatus comprising a blade having a root adapted to swing laterally within a supporting spindle under impact loading is provided with a flow path defining platform. The platform comprises an inner shroud extending generally laterally of the blade airfoil portion and adapted to swing laterally therewith. In one embodiment wherein the blade primarily comprises a laminate of composite filament plies, the inner shroud is bonded to the laminate. An outer shroud, fixed with respect to the supporting spindle, forms a lateral extension of the inner shroud with the blade in its normal operating position. The inner and outer shrouds are provided with a pair of complementary adjacent surfaces contoured to pass in relatively close-fitting relationship to each other when the blade swings under impact loadings.

13 Claims, 6 Drawing Figures

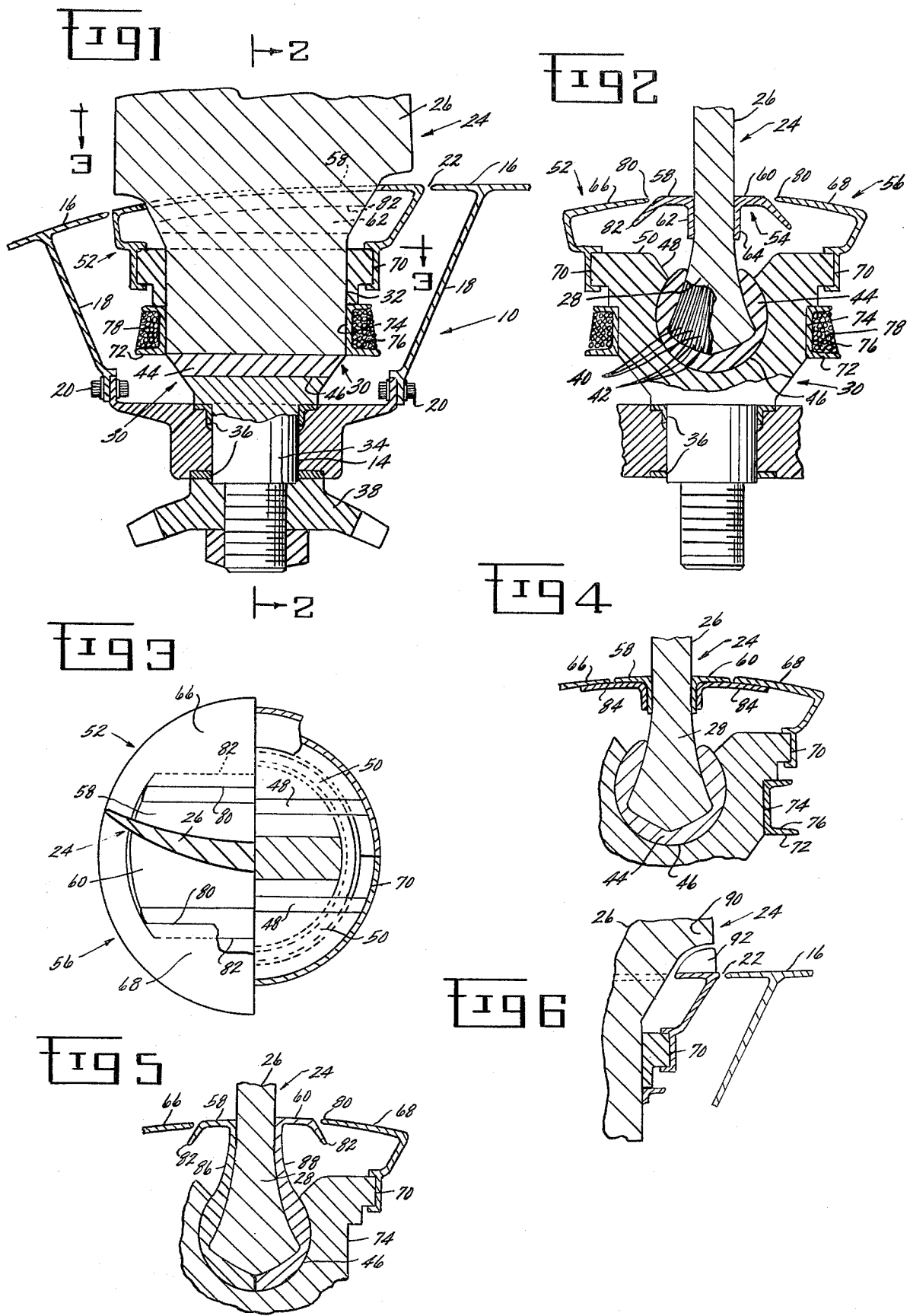

PLATFORM FOR A SWING ROOT TURBOMACHINERY BLADE

The invention herein described was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

The present invention pertains to gas turbine rotor apparatus and, more particularly, to blade flow path defining platforms for use therein.

Many rotor blades of dynamic machines such as axial flow gas turbine engine compressors and fans employ platforms extending generally laterally of the blades to partially define the aerodynamic flow path between adjacent blades. In the case of metallic blades which are retained for rotation upon the periphery of a rotatable disc, it is common to find the blade platforms cast or forged integral with the blades, laterally adjacent platforms abutting to define the flow path. Alternatively, platforms may be formed integral with the disc. In other embodiments, platforms do not entirely span the gap between adjacent blades, and flow path defining spacers are provided to fill the voids.

The trend toward incorporating composite blades into gas turbine engines has produced unique problems not heretofore experienced. By the term "composite blades" it is meant those blades formed by laminating multiple plies of elongated, small diameter filaments of high strength (high modulus of elasticity) embedded in a lightweight matrix. Typical examples are the nonmetallic composites such as graphite filaments in an epoxy resin, and the metallic composites represented by boron filaments embedded in an aluminium matrix.

One significant problem associated with composite blades is their relatively low tolerance to foreign object impact. For example, objects such as stones, ice or birds may be entrained in the airstream entering the engine inlet and impacted by the rotating blades. While damage by smaller objects may merely result in blade erosion, impact by larger objects may rupture or pierce the blade, causing failure of the blade and possible secondary damage to downstream components. This vulnerability of composite blades to foreign object damage is due to two factors. First, the lightweight matrix materials employed are relatively soft. Second, the high strength filaments are relatively hard and brittle such that the blade is incapable of significant bending without filament fracture, delamination of adjacent plies, or pullout of the filaments from the matrix.

A partial solution to the problem is to provide the composite blade with what has become known in the art as a "swing root." In such a blade, the root portion is substantially cylindrical and is received within a similarly contoured, cooperating groove in the disc such that the blade is free to swing or rotate laterally within the groove if impacted with a lateral force. Centrifugal force keeps the blade in an upright or radial position under normal operation. Since the blade is free to swing, bending stresses are eliminated and the possibility of failure reduced.

However, it becomes apparent that the typical approaches to blade platforms are no longer appropriate for swing root blades due to the relative motion and possible interference between the blade and adjacent flow path structure. The problem is further compounded if the blades are of the variable pitch variety (i.e., rotatable about the blade longitudinal axis) since an additional degree of movement is added to the system. Further, during variable pitch operation the platform may become misaligned with the adjacent flow path, providing large cavities and areas for flow disturbance. Thus, it becomes necessary to provide a unique blade platform for blades of the swing root variety, adaptable also to swing root, variable pitch blades. Preferably, the structure should minimize the potential flow leakage between relatively movable components since such leakage is directly related to rotor inefficiency.

SUMMARY OF THE INVENTION

An object of the present invention, therefore, is to provide a new and improved rotor blade platform for a swing root composite blade.

A further object of the present invention is to provide a lightweight platform structure which is also adaptable to rotor blades of the variable pitch variety and which minimizes platform flow leakage.

These and other objects and advantages will be more clearly understood from the following detailed description, the drawings and specific examples, all of which are intended to be typical of rather than in any way limiting to the scope of the present invention.

Briefly stated, the above objects are accomplished by providing in a rotor apparatus a blade having a root adapted to swing laterally under impact loadings within a supporting hub or spindle. A blade platform is provided comprising a pair of cooperating shrouds extending generally laterally of the blade. An inner shroud extending from the blade airfoil portion is adapted to swing laterally with the blade and, in one embodiment, is permanently bonded to the blade, the blade comprising as its primary structure a laminate of a plurality of composite filament plies. An outer shroud is stationary with respect to the supporting spindle and may be affixed thereto by bonding or other known fastening means. The inner and outer shrouds are provided with a pair of complementary adjacent surfaces or edges contoured to pass in close relationship to each other when the blade swings under lateral loadings. In the preferred embodiment, the inner shroud is rectangular and the outer shroud circular about their respective peripheries. Sealing means are provided for inhibiting the flow between shrouds without interfering with the ability of the blades to swing or rotate.

In another embodiment, the composite blade root is provided with a metallic outsert at least partially surrounding the filament plies and contoured to conform generally to a groove formed within the spindle. The inner shroud comprises an integral extension of the outsert thus providing redundant retention thereof since the outsert is entrapped between the blade root filament plies and the spindle.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings in which:

FIG. 1 is a partial cross-sectional view depicting a gas turbine engine variable pitch fan rotor assembly incorporating the subject invention;

FIG. 2 is a cross-sectional view, taken along line 2—2 of FIG. 1, depicting the platform of the subject invention in greater detail;

FIG. 3 is a cross-sectional view, taken along line 3—3 of FIG. 1, further depicting the platform of the subject invention;

FIG. 4 is a partial fragmentary view of the rotor assembly of FIG. 2 depicting an alternative embodiment of a platform seal;

FIG. 5 is a partial fragmentary view of the rotor assembly of FIG. 2 depicting an alternative embodiment wherein the blade outsert and inner shroud are integral; and FIG. 6 is a partial fragmentary view of FIG. 1 depicting an alternative embodiment wherein a portion of the blade airfoil is attached to the outer shroud to further alleviate platform interference during blade swing under impact loading.

DESCRIPTION OF THE PREFERRED EMBODIMENT

Referring to the drawings wherein like numerals correspond to like elements throughout, attention is first directed to FIG. 1 wherein a variable pitch fan rotor assembly depicted generally at 10 and embodying the present invention is shown. This assembly includes a fan disc 12 of generally circular periphery and rotatable about its axis, and provided with a plurality of apertures in its periphery, a typical aperture designated 14. While not so depicted, the apertures are generally circular in cross section. In addition, the disc carries a generally conical flow path defining member 16 on its radially outer extremity by means of webs 18 and bolted connections 20, the conical member 16 contoured in a fashion appropriate for mating with a generally elliptical bullet nose (not shown). The conical member 16 is also provided with a plurality of apertures on its periphery, a typical aperture designated 22 and also of generally circular cross section, each aperture 22 generally aligned with a cooperating aperture 14. The disc, thus described, is typical of that associated with the fan disposed within the inlet of the variable gas turbofan engine.

Emanating from the disc 12 are a plurality of fan blades, only one of which is shown for clarity at 24. Each of the blades incorporates an airfoil portion 26 and a root portion 28 (FIG. 2), the root being supported within a support member such as spindle 30 adapted to penetrate one of the apertures 22 in conical member 16 and cooperating aperture 14 in the disc. The spindle includes an enlarged, generally cylindrical portion 32 and a smaller, generally cylindrical portion 34 adapted to be rotatable within an aperture 14. In order to enhance this rotatable character, bushings 36 (or, alternatively, bearings not shown) are provided between the spindle 30 and the disc 12 to permit relative rotation therebetween.

In order to accomplish pivoting of the blade spindle 30 and, thus, the airfoil 26 with respect to the disc, a pinion gear or gear sector 38 is disposed about the spindle and typically cooperates with the spindle by means of a mating spline, not shown. Each such blade has its own spindle and pinion gear for individual control of its own rotation. In order to accomplish simultaneous rotation of the blades, a large ring gear (not shown) would be provided to interlock and mesh with each sector gear. Such a mechanism is taught and claimed in U.S. Pat. No. 3,873,235 - Mendelson, which is assigned to the assignee of the present invention and the specification of which is incorporated herein by reference.

Referring now to FIG. 2, the primary structure of blade 24 is shown to comprise a plurality of laminated, composite filament plies 40. Each ply comprises a plurality of generally parallel, elongated, small-diameter filaments of high modulus of elasticity embedded in a lightweight matrix. In one embodiment involving predominantly nonmetallic materials, the primary structure would comprise graphite filament laminates in an epoxy resin. However, it is understood that the present invention anticipates the use of any fiber embedded in any binder, such as an organic resin, for its primary structure. Further, it is anticipated that the structure could comprise any metallic system, including boron filaments in an aluminum matrix.

The blade root 28 is formed by splaying the filament plies 40 at their radially inner extremities by the insertion of spacers 42 therebetween. Thus, a generally bell-shaped dovetail is formed. While not so limiting, the blade root of FIG. 2 is encased in an outsert 44 of generally cylindrical profile.

Spindle 30 is shown to include a transverse groove 46 curved in a generally circular concave profile conforming to the periphery of outsert 44 and relieved at intersection 48 with the upper surface 50 of spindle 30 to permit the blade to swing, or rotate, laterally within the groove under the influence of side loadings. It can be recognized that the outsert 44 need not be exactly circular in profile but may be of any suitable profile which will permit rotation within groove 46.

Referring now to FIGS. 2 and 3 collectively, a blade platform designated generally at 52 and comprising an extension of the flow path defined by element 16 between adjacent blades is provided. The platform is shown to comprise cooperating inner platform elements 54 and outer platform element 56. Directing attention first to the inner platform element, it is apparent that it comprises a pair of laterally extending flow path defining shrouds 58 and 60 on opposite sides of airfoil portion 26 and bonded thereto along radially inwardly extending flanges 62, 64, respectively, each contoured for abutment with its respective airfoil surface. In the embodiments of FIGS. 2 and 3, the platform of the cooperating shrouds is generally rectangular. It is anticipated that the inner platform element could be fabricated of the same composite material comprising the blade, though any material which could be bonded to the blade is contemplated. Furthermore, other means of fastening, such as bolts or rivets, may be suitable in some circumstances though they have a tendency to weaken the blade structure due to the necessary addition of holes therethrough.

Directing attention now to the outer platform element 56, it becomes apparent that it comprises a pair of outer shrouds 66 and 68, but of generally semicircular periphery and cooperating to essentially span the circular gap between inner shrouds 58, 60 and element 16. At their radially inner extremity, channels 70 engage and surround a cooperating spindle flange and are bonded thereto. Alternatively, the outer shrouds could be formed integral with the spindle. Edges 80 are contoured to generally conform to the shape of the adjacent inner shroud, herein rectangular, but spaced therefrom such that under blade impact the inner shroud passes edge 80 in relatively close-fitting relationship, preferably without contacting.

In order to improve sealing between the various platform elements and thus reduce performance losses, each inner platform element is provided with a seal comprising generally lateral shroud extensions 82 forming an obtuse angle with their respective inner shrouds 58, 60, the extensions underlying the outer shrouds 66, 68, when the blade is in an unrotated position. The extensions are also contoured to pass in close-fitting relationship to the outer shroud under impact. Alternatively, the extensions may be arcuate in cross section to more nearly conform to the path of shroud 58 as its swings under impact loads, thereby providing a constant area gap between edges 80 and extensions 82.

In the embodiment of FIG. 4 wherein only one side of the blade is shown for clarity, flexible seals are bonded to the inner shroud 58 in underlying relationship to shrouds 68 and in rubbing contact therewith. With such a configuration, the gap between cooperating shrouds is minimized and leakage losses correspondingly reduced.

In yet another embodiment (FIG. 5), the inner platform elements are formed integral with outsert 44 in the form of a pair of cooperating inner platform segments 86, 88 which may or may not be bonded to the blade. Such an embodiment offers the inherent advantage of entrapping the platform between the blade root and the spindle such that even if bonding between the segments and the blade is lost, the segment will still be retained within the rotor assembly. Thus, redundancy is provided.

As best shown in FIGS. 2 and 3, the inner shrouds do not completely circumscribe the spindle but are separated by a distance sufficient to permit the blade root 28 to be inserted therebetween into groove 46. The blade root is locked within its spindle by means of a generally cylindrical locking collar 72 which slides over a diameter step 74 of cylindrical portion 30 and which overlays the ends of blade root 28 to prevent displacement thereof with respect to the spindle. The locking collar is of generally U-shaped cross section having a channel 76 extending about the outer periphery thereof. It has been discovered that under certain extreme centrifugal loadings, some spindles have a tendency to separate laterally due to the inherent weakness caused by groove 46. This tendency can be arrested by winding high-strength, elongated composite filaments 78 such as boron filaments, around the spindle within channel 76 to increase the collar hoop strength.

It should become obvious to one skilled in the art that certain changes can be made to the above-described invention without departing from the broad inventive concepts thereof. For example, as is shown in FIG. 6, airfoil section 26 may be segmented into a main portion 90 which is laterally rotatable with the blade root and a second portion 92 which is rigidly mounted upon the outer shroud to minimize interference during blade swing, the first and second portions contoured to pass in relatively close-fitting relationship to each other.

Further, while the present invention has been directed toward composite blades and platforms, it is equally applicable to noncomposite structures. Additionally, the present invention is not restricted to rotors, since it is apparent that stationary blade rows could be provided with swing roots necessitating platforms of the type described herein. It is intended that the appended claims cover these and all other variations in the present inventions's broader inventive concepts. 9n

Having thus described the invention, what is considered novel and desired to be secured by Letters Patent of the United States is:

1. A rotor apparatus comprising:
    a blade having a root portion and an airfoil portion;
    means for supporting said blade including a groove curved in a generally circular concave profile to receive the blade root, the blade root conforming partially to the same profile, such that the blade is permitted to rotate laterally within the groove;
    an inner flow path shroud extending generally laterally of the blade airfoil portion and laterally rotatable therewith; and
    an outer flow path shroud nonrotatable with respect to said supporting means and in general alignment with the inner flow path shroud when the blade is in an unrotated position; wherein
    said inner and outer shrouds are provided with a pair of complementary adjacent surfaces contoured to pass in relatively close-fitting relationship to each other when said blade is rotated laterally.

2. The rotor apparatus as recited in claim 1 wherein said blade supporting means comprises a spindle for a variable pitch rotor apparatus.

3. The rotor apparatus as recited in claim 1 wherein the blade primarily comprises a laminate of composite filament plies and the inner flow path shroud is bonded to the blade.

4. The rotor apparatus as recited in claim 1 wherein the blade primarily comprises a laminate of composite filament plies and the root portion includes an outsert partially surrounding the plies and contoured to conform generally to the profile of the groove.

5. The rotor apparatus as recited in claim 4 wherein the inner shroud is formed integral with the outsert.

6. The rotor apparatus as recited in claim 5 wherein the inner shroud is bonded to the blade.

7. The rotor apparatus as recited in claim 2 wherein said outer shroud comprises a pair of complementary shroud halves of generally circular periphery and contoured to circumscribe the inner shroud.

8. The rotor apparatus as recited in claim 7 wherein said inner shroud is of generally rectangular profile.

9. The rotor assembly as recited in claim 2 wherein said outer shroud is formed integral with the spindle hub.

10. The rotor assembly as recited in claim 1 further comprising sealing means for inhibiting fluid flow between said inner and outer shrouds.

11. The rotor assembly as recited in claim 10 wherein said sealing means comprises a flexible seal bonded to the inner shroud, and underlying the outer shroud in rubbing contact therewith.

12. The rotor assembly as recited in claim 10 wherein said sealing means comprises a lateral extension of the inner platform forming an obtuse angle therewith, the extension underlying the outer shroud when the blade is in an unrotated position and contoured to pass in close-fitting relationship without contacting the outer shroud when the blade is rotated.

13. The rotor assembly as recited in claim 1 wherein the blade airfoil is segmented into a first portion which is laterally rotatable with the blade root and a second portion which is rigidly mounted upon the outer shroud, the first and second portions contoured to pass in relatively close-fitting relationship to each other when said blade is rotated laterally.

* * * * *